(12) United States Patent
Iwai et al.

(10) Patent No.: US 8,342,299 B2
(45) Date of Patent: Jan. 1, 2013

(54) BICYCLE DISK BRAKE PAD WITH WELDED AND ADHESIVELY BONDED LAYERS

(75) Inventors: Toru Iwai, Kitakatsuragi (JP); Takashi Fujitani, Sakai (JP)

(73) Assignee: Shimano, Inc., Sakai (JP)

( * ) Notice: Subject to any disclaimer, the term of this patent is extended or adjusted under 35 U.S.C. 154(b) by 1857 days.

(21) Appl. No.: 10/907,848

(22) Filed: Apr. 18, 2005

(65) Prior Publication Data

US 2005/0269167 A1 Dec. 8, 2005

(30) Foreign Application Priority Data

Jun. 8, 2004 (JP) .................. 2004-169768

(51) Int. Cl.
*F16D 65/04* (2006.01)

(52) U.S. Cl. ................. 188/250 B; 188/205 G (58) Field of Classification Search ............. 188/250 B, 188/250 G, 73.1, 251 A, 251 M; 192/107 M
See application file for complete search history.

(56) References Cited

U.S. PATENT DOCUMENTS

| | | | |
|---|---|---|---|
| 3,710,071 A * | 1/1973 | Volker et al. | 219/93 |
| 4,453,621 A | 6/1984 | Warwick et al. | |
| 4,991,697 A * | 2/1991 | Hummel et al. | 188/250 B |
| 5,455,485 A | 10/1995 | Kutter | |
| 6,206,151 B1 * | 3/2001 | Nakamura | 188/250 B |
| 6,279,222 B1 * | 8/2001 | Bunker et al. | 29/527.5 |
| 2004/0118645 A1 * | 6/2004 | Killian et al. | 188/218 XL |

FOREIGN PATENT DOCUMENTS

| | | |
|---|---|---|
| FR | 1286058 | 3/1962 |
| JP | 04282037 * | 10/1992 |
| JP | 2652734 B2 | 4/1993 |
| JP | 3378268 B2 | 11/1993 |
| JP | 07-329852 A | 12/1995 |
| JP | 3289175 B2 | 9/1996 |
| JP | 11-210792 A | 8/1999 |
| JP | 2001-035673 A | 2/2001 |
| JP | 2004-088812 A | 3/2004 |

* cited by examiner

*Primary Examiner* — Robert A Siconolfi
(74) *Attorney, Agent, or Firm* — James A. Deland (57) ABSTRACT

A bicycle disk brake pad comprises a backing plate and a friction member. A first joined area of the friction member is welded to the backing plate, and a second joined area of the friction member is adhesively joined to the backing plate.

17 Claims, 9 Drawing Sheets

BICYCLE DISK BRAKE PAD WITH WELDED AND ADHESIVELY BONDED LAYERS

BACKGROUND OF THE INVENTION

The present invention is directed to bicycles and, more particularly, to a bicycle disk brake pad.

Disk brake pads normally pinch a disk brake rotor that rotates along with the wheel in order to brake the wheel. Conventionally known disc brake pads of this type sometime comprise a sintered metal friction member bonded to a stainless steel backing plate, for example. The sintered metal friction member usually is produced by diffusion bonding while simultaneously bonding it to the back plate. More specifically, the backing plate is copper plated, and then the metal that is to form the friction member is sintered and bonded to the copper plated surface by exposing the entire structure to elevated temperatures of as much as 900° C. Because the backing plate is exposed to such high temperatures, the metals that can be used to form the backing plate are limited to those with a relatively high specific gravity, such as stainless steel alloys, etc., which are resistant to those temperatures. This makes it impossible to reduce the weight of brake pads, which would be particularly desirable in bicycles.

One possibility to reduce the weight of the brake pad is to adhesively bond a sintered metal friction member to a lightweight backing plate. However, friction members that are adhesively bonded to the backing plate may have poor separation strength and unsatisfactory bonding strength during hard braking when the brake pad may be subjected to temperatures of around 300° C.

SUMMARY OF THE INVENTION

The present invention is directed to various features of a disk brake pad. In one embodiment, a bicycle disk brake pad comprises a backing plate and a friction member. A first joined area of the friction member is welded to the backing plate, and a second joined area of the friction member is adhesively joined to the backing plate. Additional inventive features will become apparent from the description below, and such features may be combined with the above features to provide additional benefits.

DETAILED DESCRIPTION OF THE EMBODIMENTS

Figure 1:
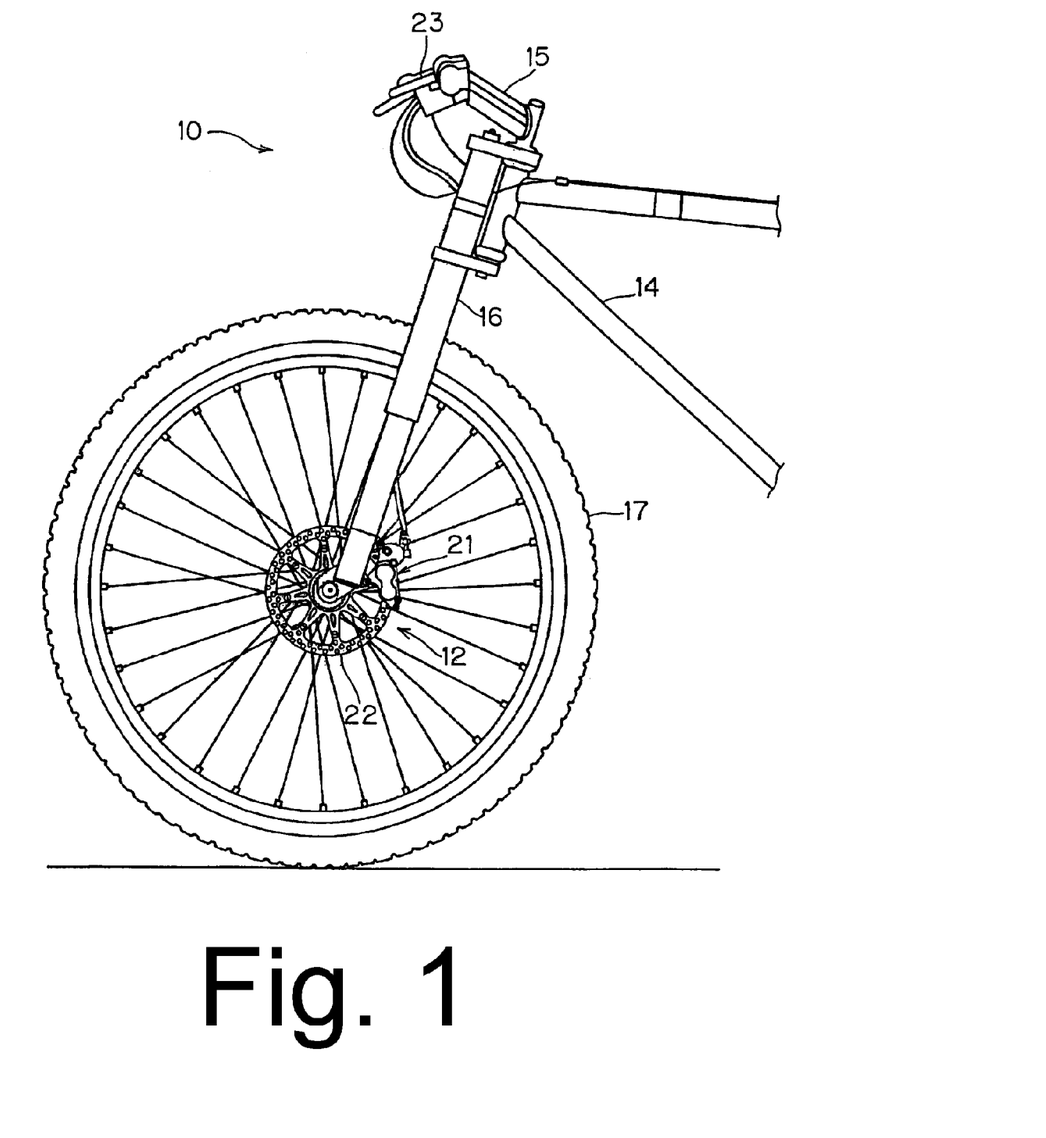
FIG. 1 is a side view of a bicycle with a particular embodiment of a disk brake apparatus.

FIG. 1 is a side view of a bicycle 10 with a particular embodiment of a complete disk brake apparatus 12. Bicycle 10 is a conventional bicycle with a frame 14 supporting a handlebar 15, front and rear forks 16 (only the front fork is shown), front and rear wheels 17 (only the front wheel is shown), and a drive device comprising a sprocket and chain (not shown). Since the structure of such a conventional bicycle is well known in the field, further description if its structure shall be omitted.

Disk brake apparatus 12 comprises a brake caliper 21 mounted on front fork 16, a brake rotor 22 attached to a hub 17a of front wheel 17 so that brake rotor 22 rotates integrally with front wheel 17, and a brake operating mechanism 23. Brake caliper 21 is attached to front fork 16 near brake rotor 22, and it applies a frictional force to brake rotor 22 in response to the operation of brake operating mechanism 23 to stop the rotation of brake rotor 22 and front wheel 17. Brake rotor 22 comprises a centrally disposed hub mounting member 22a attached to hub 17a and a ring-shaped rotor member 22b for contacting brake pads 76.

Figure 2:
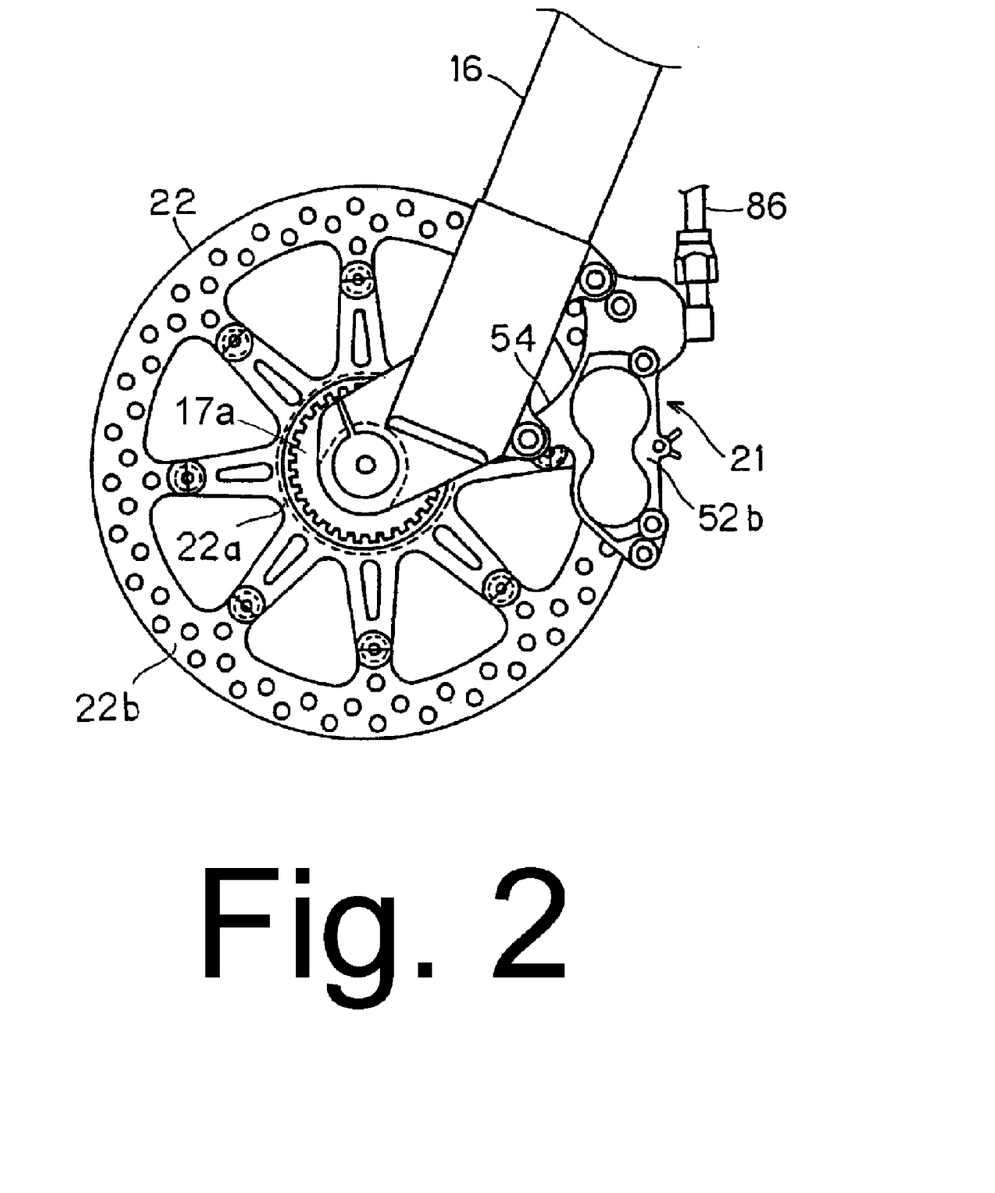
FIG. 2 is a side view of the disk brake apparatus.
Figure 3:
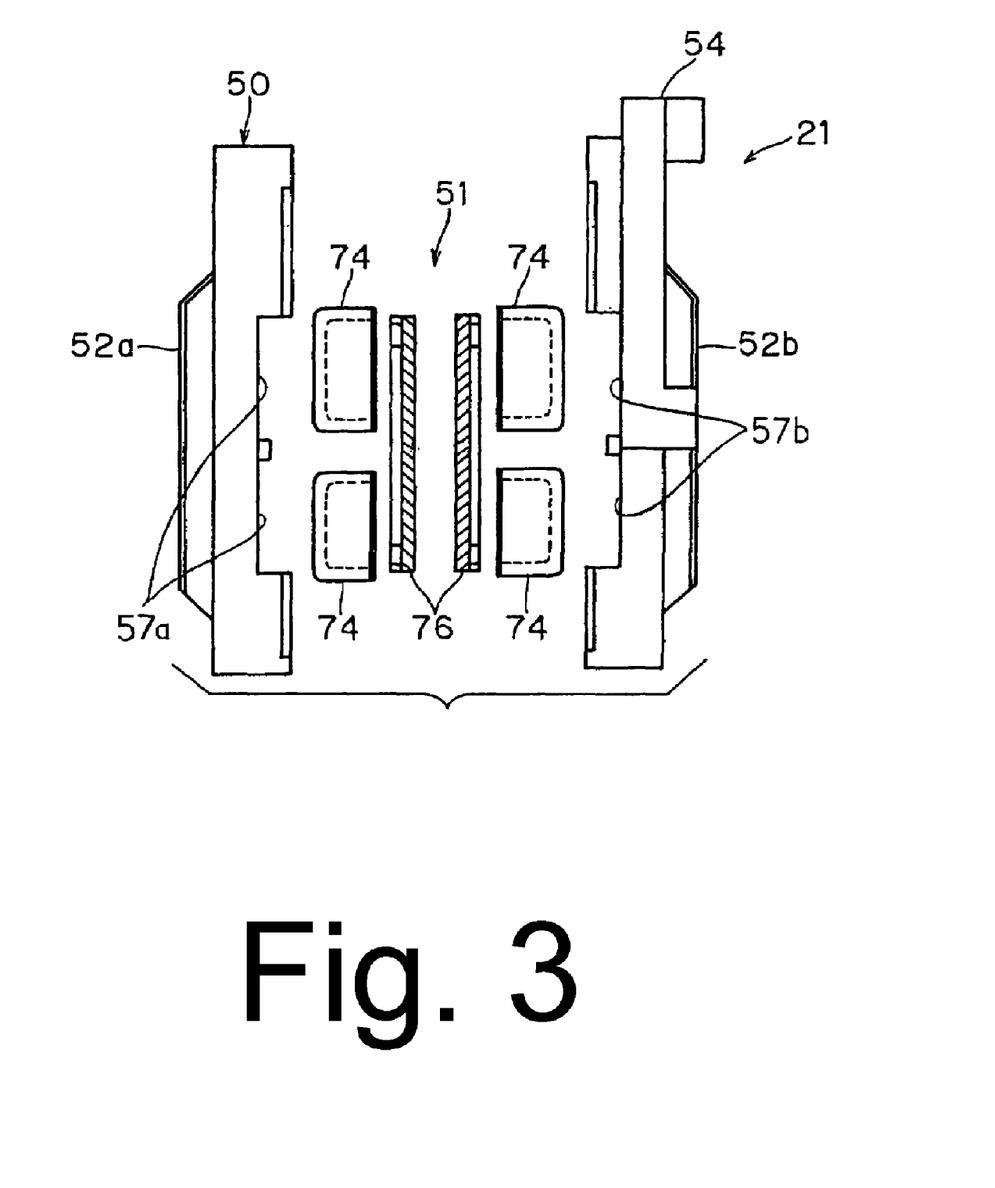
FIG. 3 is an exploded schematic view of the brake caliper assembly.

As shown in FIGS. 2 and 3, brake caliper 21 comprises a housing 50 and a piston unit 51. Housing 50 is constructed of a thermally conducting material such as an aluminum alloy, and it comprises a first housing member 52a and a second housing member 52b bolted together in a conventional manner to form a slot to receive brake rotor 22 therebetween. Housing members 52a and 52b have substantially the same shape, except that hydraulic tubing 86 for brake operating mechanism 23 is connected to second housing member 52b to supply brake oil to both housing members 52a and 52b. Second housing member 52b also has an outwardly extending flange that forms an attachment member 54 for bolting brake caliper 21 to front fork 16.

As shown in FIG. 3, piston unit 51 comprises four pistons 74 and a pair of brake pads 76. Pistons 74 slidably fit into round cylinders 57a and 57b formed in housing members 52a and 52b so as to move between a brake release position and a braking position. Brake pads 76 move integrally with pistons 74. Thus, when pistons 74 move from the brake release position to the braking position, the brake pads 76 also move from the brake release position to the braking position. When in the braking position, brake pads 76 press against and apply a frictional force to brake rotor 22 to thereby decrease or stop rotation of brake rotor 22 and front wheel 17. When in the brake release position, the brake pads 76 are spaced apart from brake rotor 22, thus allowing brake rotor 22 and front wheel 17 to freely rotate.

Figure 4:
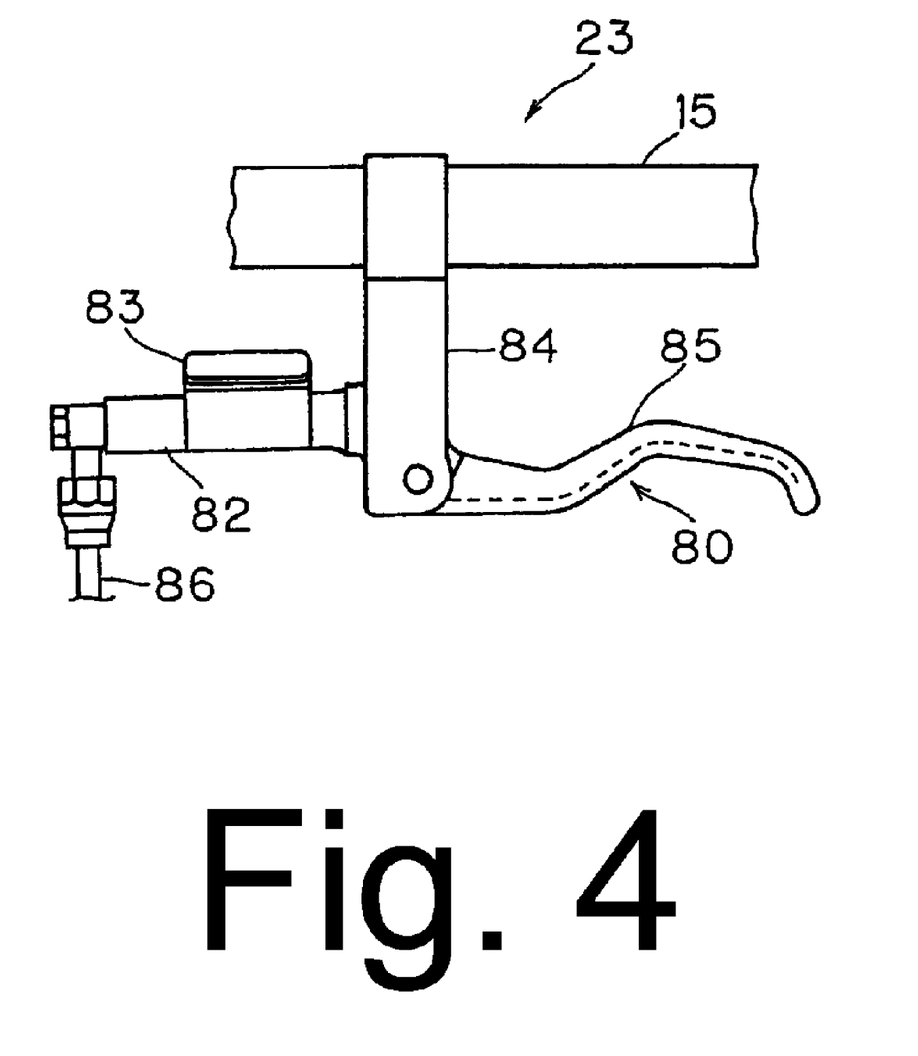
FIG. 4 is a plan view of a particular embodiment of a brake operating device.
Figure 5:
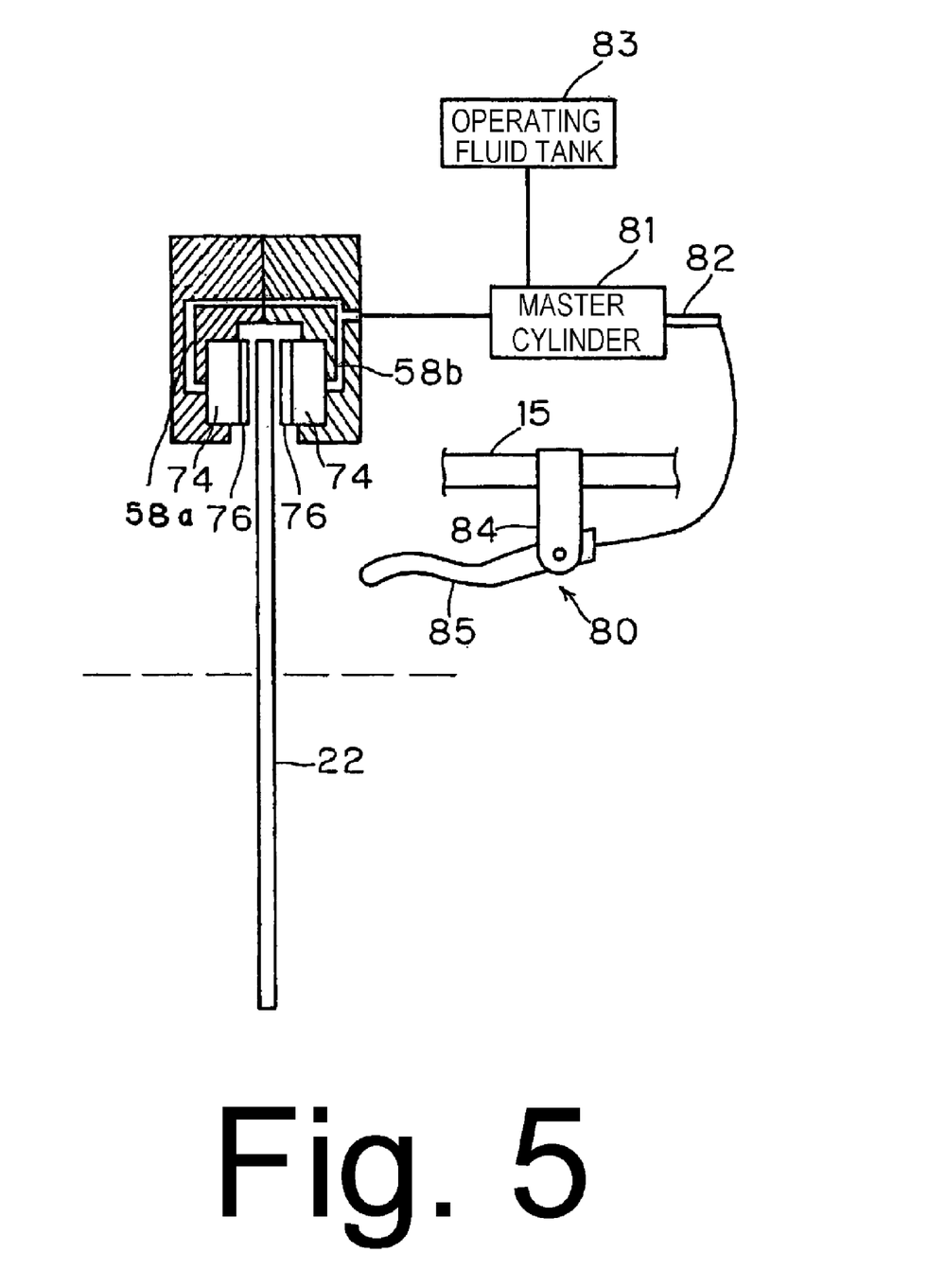
FIG. 5 is a schematic diagram of a particular embodiment of a hydraulic circuit for the disk brake apparatus.

As shown in FIGS. 4 and 5, the brake operating mechanism 23 is attached to handlebar 15. Brake operating mechanism 23 comprises a brake lever assembly 80, a master cylinder 81, a piston 82, and an operating fluid tank 83. Brake lever assembly 80 comprises a bracket 84 mounted on handlebar 15 and a lever component 85 pivotably mounted on bracket 84. Bracket 84 is integrally formed with master cylinder 81, and piston 82 and operating fluid tank 83 are supported by bracket 84. Piston 82 is slidingly disposed within master cylinder 81, and operating fluid tank 83 is in fluid communication with master cylinder 81. One end of piston 82 is connected to lever component 85 so that piston 82 reciprocates inside master cylinder 81 in response to the pulling and releasing of lever component 85. Pulling lever component 85 causes pressurized oil to move through the hydraulic tubing 86 connected to brake caliper 21, the pressurized oil moves pistons 74, brake pads 76 contact and apply frictional force to brake rotor 22, and the front wheel 17 is braked.

Figure 6:
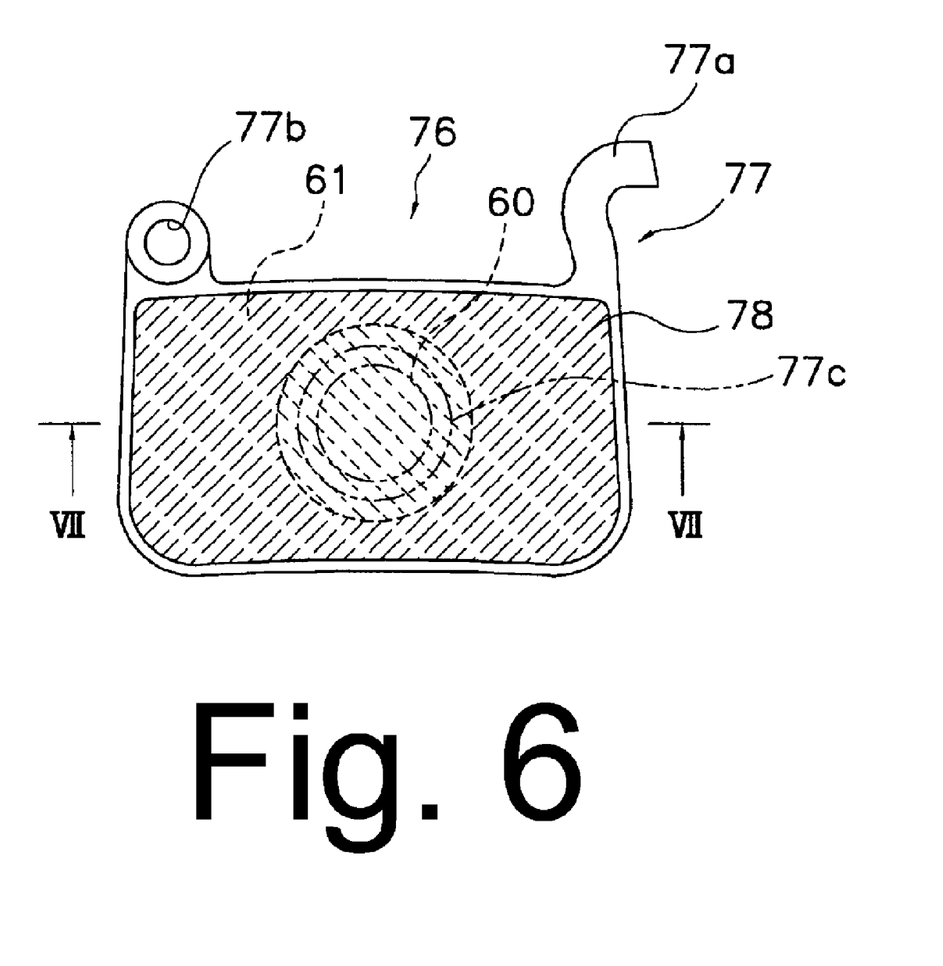
FIG. 6 is a plan view of a particular embodiment of a brake pad.
Figure 7:
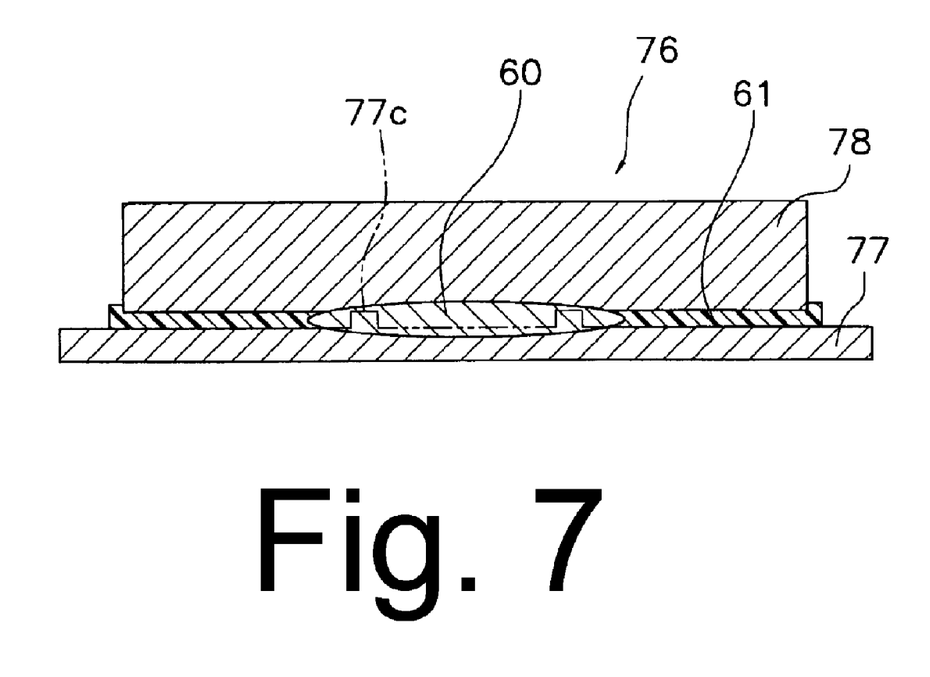
FIG. 7 is a view taken along line VII-VII in FIG. 6.

As shown in FIGS. 6 and 7, brake pad 76 may comprise a friction member 78 made of sintered metal that is laminated to a backing plate 77 made of a light metal such as an aluminum alloy or titanium alloy. Friction member 78 may have a thickness of from approximately 2.0 mm to approximately 2.5 mm, for example. Backing plate 77 may comprise a sheet made of a lightweight metal such as an aluminum alloy, a titanium alloy, or any other appropriate lightweight metal having a thickness in the range of from approximately 1.5 mm to approximately 1.8 mm, for example. Backing plate 77 includes a hook-shaped detent 77a and a round support 77b, both of which are slidably supported by first and second housing members 52a and 52b. Backing plate 77 also has convex parts 77c in the form of continuous annular protrusions that protrude toward friction member 78 and are located in the center of backing plate 77. Protrusions 77c may protrude from the upper surface of backing plate 77 by approximately 0.1 mm to approximately 0.5 mm, preferably 0.3 mm, for example. A welding process described below subsequently eliminates protrusions 77c.

The region where backing plate 77 and friction member 78 are joined has a first joined area 60 and a second joined area 61. First joined area 60 is a metal layer that is welded from protrusions 77c and friction member 78 in a manner described below. First joined area 60 is a substantially round area that encloses the inner and outer peripheries of protrusions 77c, and it is located substantially in a center of a combination of first joined area 60 and second joined area 61. Second joined area 61 is formed around first joined area 60, and it is adhesively bonded to backing plate 77, wherein the adhesive may comprise a phenolic resin adhesive, for example.

In this embodiment, the sintered metal friction member 78 is not joined to backing plate 77 at the same time that friction member 78 is sintered. Instead, the step for sintering friction member 78 and the step for joining friction member 78 to backing plate 77 are separate. As a result, backing plate 77 is not subjected to the high temperatures required for sintering friction member 78. This substantially eliminates the restriction on the materials used to fabricate backing plate 77. Thus, in this embodiment, lighter metals such as aluminum alloys or titanium alloys can be used to make backing plate 77, thus resulting in a lighter brake pad 76. The adhesively bonded second joined area 61 ensures a basic bonding strength, whereas the welded first joined area 60 ensures that friction member 78 has the same satisfactory bonding strength at both lower and elevated temperatures.

Figure 8:
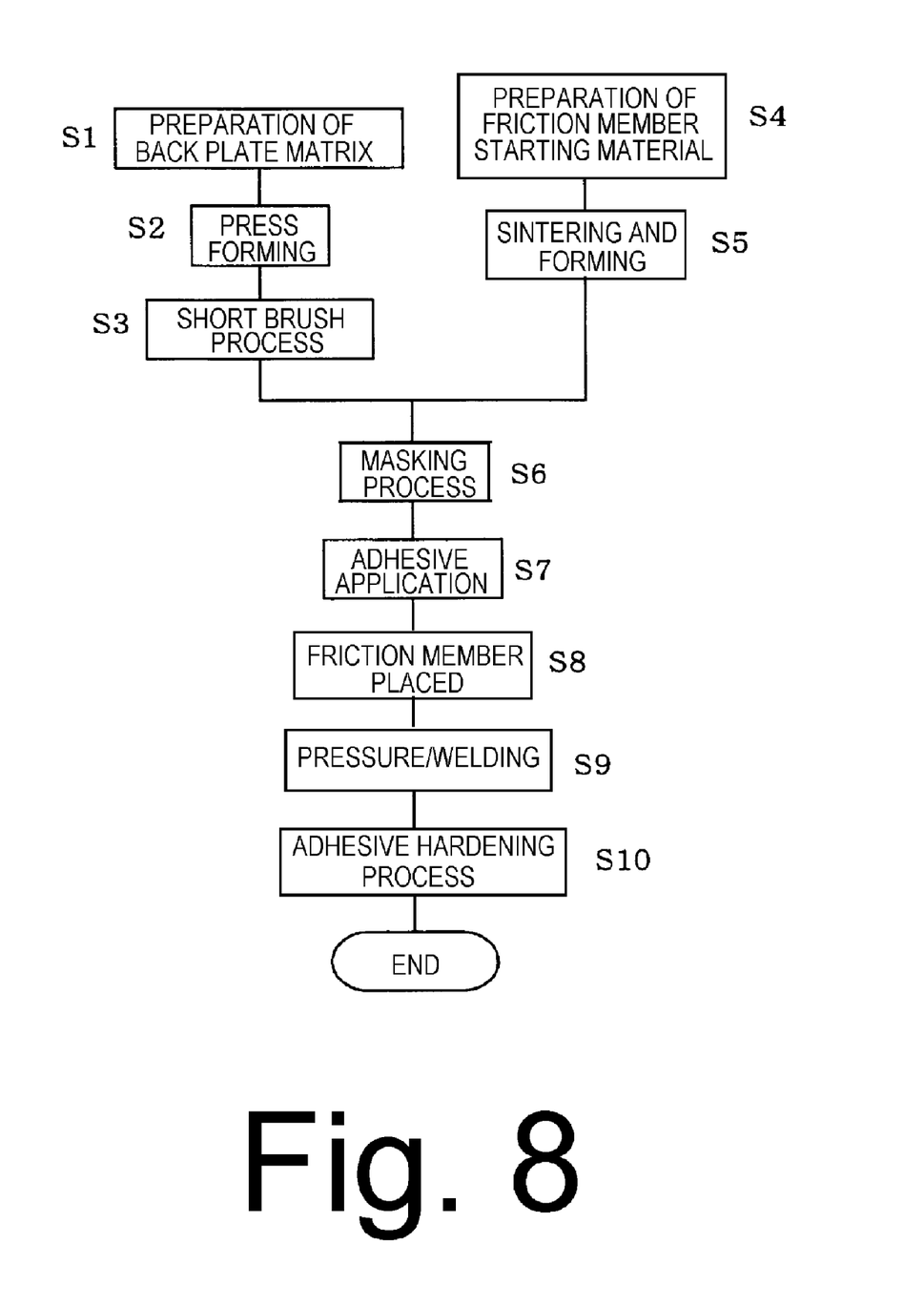
FIG. 8 is a flow chart of a particular embodiment of a method of fabricating the brake pad.

FIG. 8 is a flow chart of a particular embodiment of a method of fabricating brake pad 76, and FIGS. 9A-9E are cross sectional views of brake pad 76 during fabrication. As shown in FIG. 8, in Step S1, a sheet of aluminum alloy or titanium alloy (or any of a number of lightweight metals) serving as the matrix for backing plate 77 is prepared in Step S1. In Step S2, the peripheral shape of backing plate 77 is press formed using a hydraulic punch, for example, and the protrusions 77c are formed in the center. In Step S3, a short brush treatment is performed on the surface of the sheet to facilitate the adhesion of the adhesive. This completes the preparation of backing plate 77.

Meanwhile, a starting material that is to be sintered to produce friction member 78 is prepared in Step S4. The starting material may comprise a metal powder such as dichromium trioxide, tin or compounds thereof, copper or compounds thereof, etc. In Step S5, a mold is filled with the starting material, and the material is pressed at 900° C. so that it is sintered and formed into the desired shape. This concludes the preparation of friction member 78. The preparation of backing plate 77 and friction member 78 may be performed separately and simultaneously, or in any desired sequence.

Figure 9A:
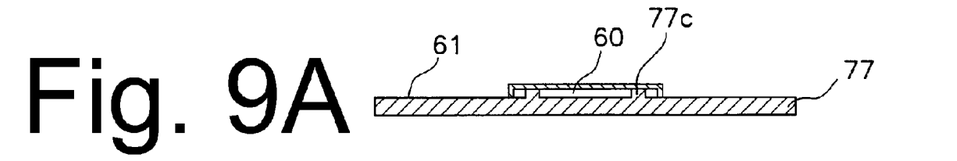
FIGS. 9A-9E are cross sectional views of the brake pad during fabrication.
Figure 9B:
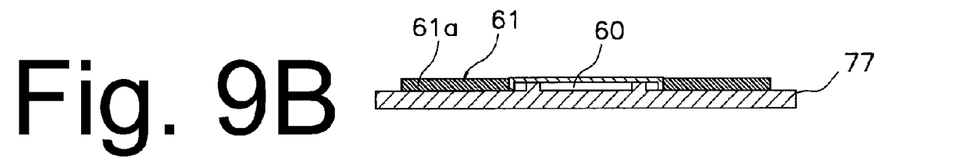
Figure 9C:
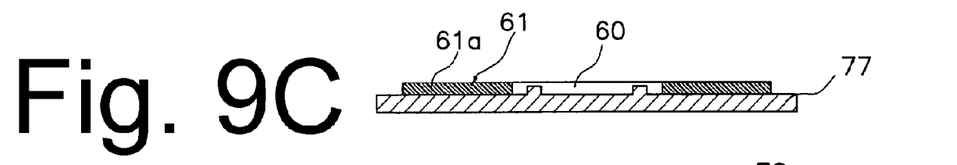
Figure 9D:
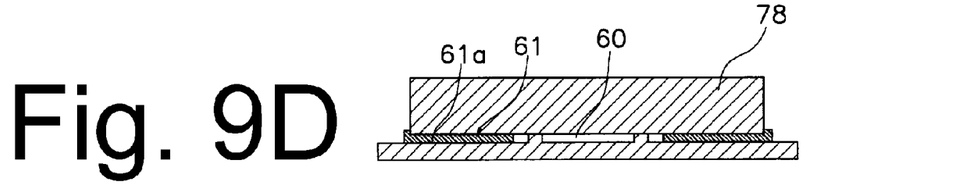
Figure 9E:
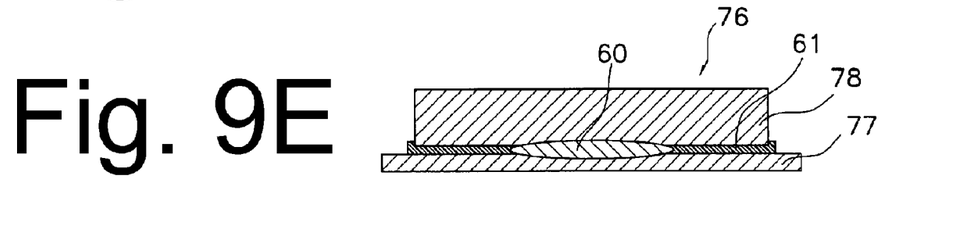

After backing plate 77 and friction member 78 have been prepared, the inner periphery of protrusions 77c and the immediate area around protrusions 77c that is to become the first joined area 60 are masked off in Step S6 to produce the structure shown in FIG. 9A. In Step S7, a phenolic resin adhesive 61a, for example, is applied to the area which is to become the second joined area 61 to produce the structure shown in FIG. 9B, and then the previously applied mask is removed to produce the structure shown in FIG. 9C. In Step S8, the prepared friction member 78 is positioned on the adhesively coated backing plate 77 to produce the structure shown in FIG. 9D. In Step S9, the molds are loaded and pressed at a load of approximately 250 kg, for example, and an electrical potential of approximately 350 V is applied for approximately 10 milliseconds to the first joined area 60. As shown in FIG. 9E, the protrusions 77c and the friction member 78 are fused to weld the central portion of friction member 78 to backing plate 77 to form first joined area 60, while friction member 78 is adhesively joined by adhesive 61a to backing plate 77 to form second joined area 61. In Step S10, heating for approximately 15 minutes at approximately 180° C. in a heating furnace hardens adhesive 61a to complete the fabrication of brake pad 76.

Since friction member 78 and backing plate 77 are joined through a combination of welding and adhesive bonding, the parts may be joined more rapidly, with fewer limitations imposed on the material used for backing plate 77. In addition to the more rapid bonding, basic bonding strength as well as bonding strength at both normal and elevated temperatures during use is ensured. The above described method also minimizes adverse effects such as deformation of backing plate 77 or friction member 78 which may occur when the entire friction member 78 is welded to backing plate 77.

While the above is a description of various embodiments of inventive features, further modifications may be employed without departing from the spirit and scope of the present invention. For example, while protrusions 77c were formed in the shape of annular protrusions, protrusions 77c may have a number of configurations provided that the flow of electricity can be concentrated during electrical welding. Protrusions 77c may be formed as closed strips in the shape of a rectangular frame, or they need not form a closed shape. Convex components or protrusions also may be provided along the periphery of backing plate 77 to facilitate positioning of friction member 78.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:
1. A bicycle disk brake pad comprising:
   a backing plate;
   a friction member;
   wherein a first joined area of the friction member is welded to the backing plate such that the first joined area is sandwiched between the friction member and the backing plate;

wherein a second joined area of the friction member is adhesively joined to the backing plate such that the adhesive is sandwiched between the friction member and the backing plate; and wherein there is no adhesive in the first joined area.

2. The brake pad according to claim 1 wherein the first joined area is located in substantially a center of a combination of the first joined area and the second joined area.

3. The brake pad according to claim 1 wherein the first joined area has a curved shape.

4. The brake pad according to claim 1 wherein the friction member comprises a sintered metal.

5. The brake pad according to claim 1 wherein the backing plate comprises an aluminum alloy.

6. The brake pad according to claim 5 wherein the friction member comprises a sintered metal.

7. The brake pad according to claim 1 wherein the backing plate comprises a titanium alloy.

8. The brake pad according to claim 7 wherein the friction member comprises a sintered metal.

9. A bicycle disk brake pad comprising:
a backing plate;
a friction member;
wherein a first joined area of the friction member is welded to the backing plate;

wherein the first joined area is formed by fusing, with the friction member, a protrusion of the backing plate that protrudes from the backing plate; and wherein a second joined area of the friction member is joined to the backing plate by an adhesive.

10. The brake pad according to claim 9 wherein the protrusion has an annular shape.

11. The brake pad according to claim 9 wherein the adhesive surrounds the first joined area.

12. The brake pad according to claim 9 wherein the first joined area is centrally disposed relative to the friction member.

13. The brake pad according to claim 9 wherein the first joined area is formed by welding the protrusion with the friction member.

14. The brake pad according to claim 9 wherein there is only one first joined area.

15. The brake pad according to claim 14 wherein the adhesive surrounds the first joined area.

16. The brake pad according to claim 15 wherein the first joined area is centrally disposed relative to the friction member.

17. The brake pad according to claim 16 wherein the protrusion has an annular shape.

* * * * *